Patented May 20, 1947

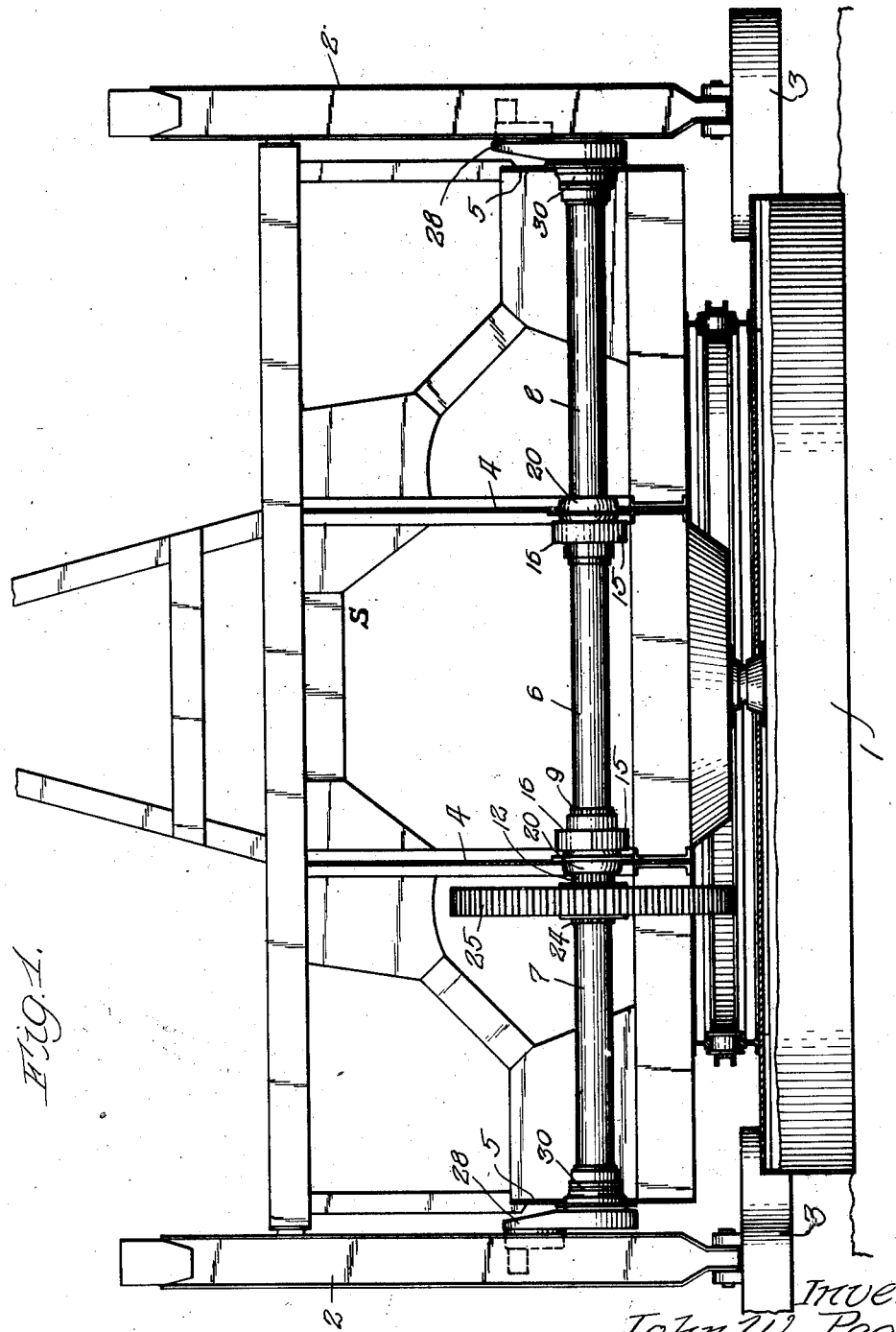

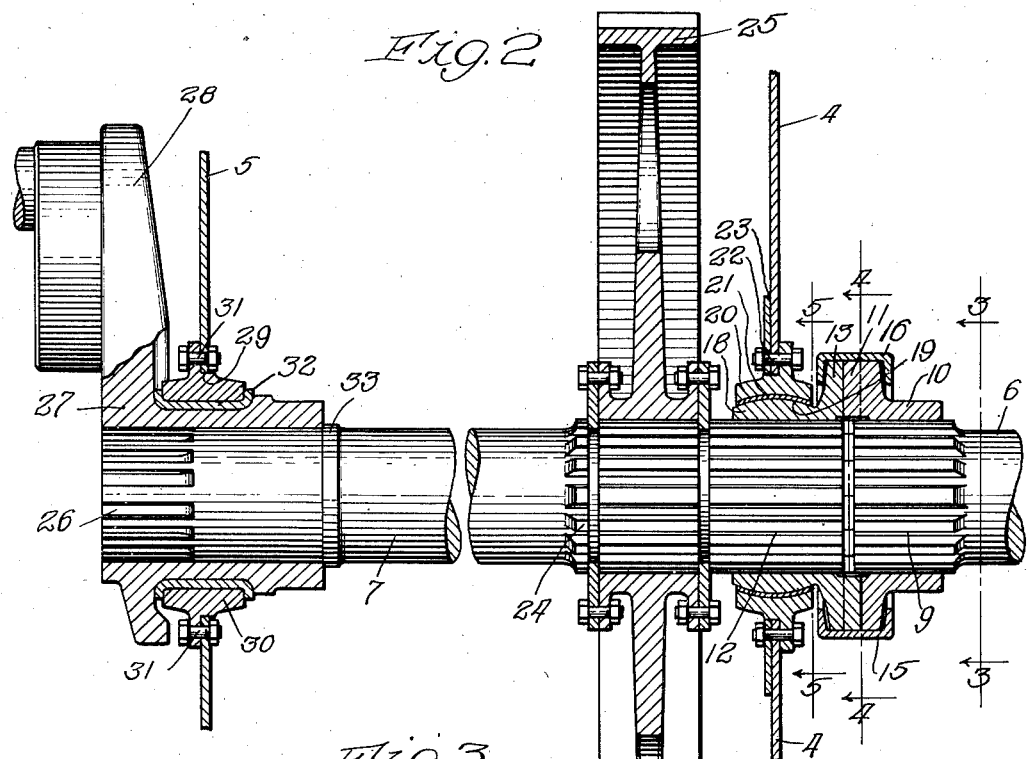
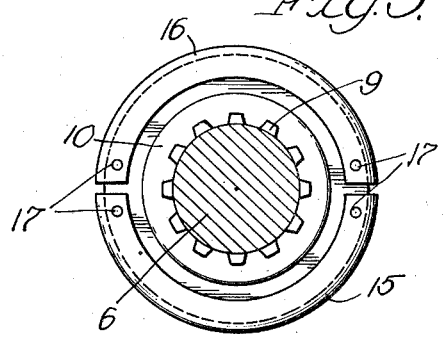
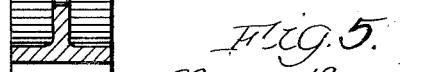
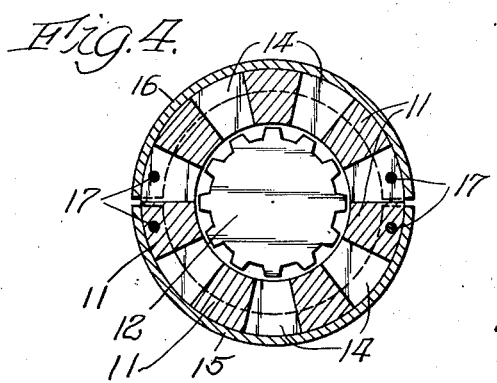

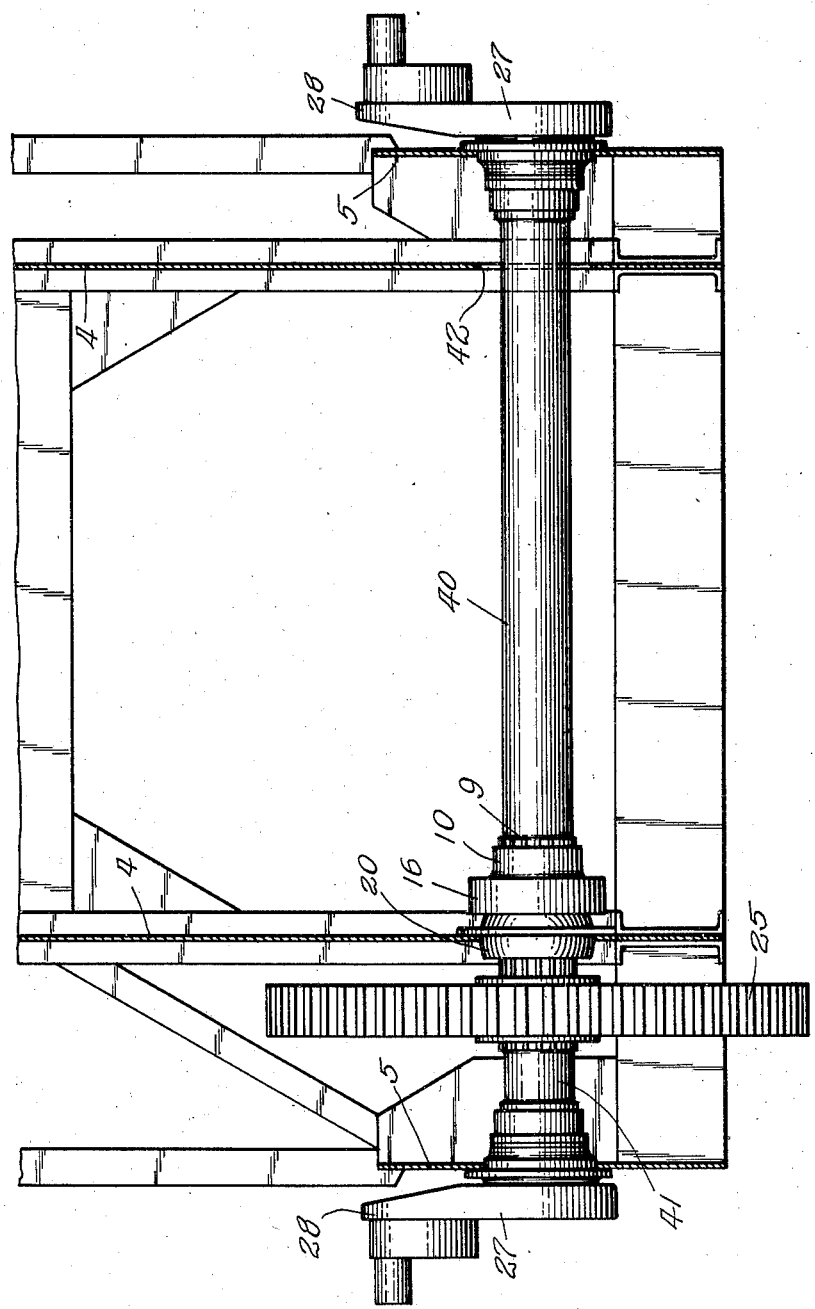

2,420,675

UNITED STATES PATENT OFFICE 2,420,675

DRIVING SHAFT AND BEARING SUPPORT THEREFOR IN WALKING DRAGLINE MACHINE

John W. Page, Chicago, Ill., assignor to Page Engineering Company, a corporation of Illinois Application August 2, 1945, Serial No. 608,453

12 Claims. (Cl. 180—8)

This invention relates to an improved mechanism for walking dragline machines and the like, having walking mechanism, adapted for use in connection with excavating, digging and material handling and driving machinery and apparatus, such as, for example, dredges, diggers, dragline buckets, scrapers, pile drivers, and other devices using heavy machinery. More particularly this invention comprehends the elimination of the binding or cramping strains on the inner bearings as the body of the machine deforms under the heavy stresses set up by the walking mechanism, which binding action and strains, prior to my invention, have been serious factors in the maintainance of heavy machines of this type.

This invention is an improvement upon the type of walking mechanism disclosed in my prior Patents No. 2,164,120, granted June 27, 1939; No. 2,230,759, granted February 4, 1941; and No. 2,290,118, granted July 14, 1942.

In machines of the type referred to, in use prior to my invention, the bearings for supporting the driving shaft in the superstructure were formerly straight and due to the tendency to deformation of the superstructure under the heavy stresses set up in the operation of the machine, such straight bearings, being unable to conform to the deformations of the machine, would have stresses set up therein, caused by the binding of the driving shaft in the bearing under such deformations. An example of such straight bearings is shown in my Patent No. 2,164,120 referred to above. By the present invention I have eliminated such binding action with its attendant strains, by providing a universal bearing capable of accommodating any misalinement of the shaft sections, and distortion between the superstructure and the driving shaft.

Among the objects of my invention is to provide a novel and improved machine of the type referred to; to provide in machines having walking mechanism and other heavy parts requiring considerable power in their operation, provision for effectively relieving the binding or cramping strains heretofore present in the bearings in which the driving shaft is mounted in the superstructure; to provide improved bearing means in machines having walking mechanism and other heavy parts requiring considerable power, and in which distortions may be set up; and such further objects, advantages and capabilities, inherently possessed by my invention, as will later more fully appear.

My invention further resides in the combination, construction and arrangement of parts illustrated in the accompanying drawings, and while I have shown therein a preferred embodiment, I wish it understood that the same is susceptible of modification and change without departing from the spirit of my invention.

In the drawings:

Fig. 1 is an end elevation of a machine having walking mechanism and embodying my invention, parts being shown in section for the sake of clearness.

Fig. 2 is a fragmentary vertical section taken on a plane passing through the center of the driving shaft but showing the driving shaft and a portion of the crank arm in elevation for the sake of clearness.

Fig. 3 is a vertical transverse section on the line 3—3 of Fig. 2.

Fig. 4 is a vertical transverse section on the line 4—4 of Fig. 2.

Fig. 5 is a vertical transverse section on the line 5—5 of Fig. 2.

Fig. 6 is a view generally similar to Fig. 1, but showing a modified driving shaft arrangement.

Referring more in detail to the drawings the machine shown in Fig. 1 for illustrative purposes only, and as embodying one form of my invention, comprises a main base 1, which may be circular in contour or of any other desired shape, and upon which is mounted a superstructure S, there being provided one upon each side of the superstructure a walking arm 2 each provided at its lower end with a foot or auxiliary base 3 pivotally connected to the walking arm. Included in the superstructure is a pair of longitudinally extending trusses 4 and a pair of outriggers 5, one on each side of the machine adjacent the walking leg. As will be understood the superstructure includes such additional supporting members as may be required for the proper and safe operation of the machine. There is preferably mounted upon the upper surface of the main base 1 suitable supporting means to permit the superstructure to be horizontally rotated upon the base, although the present invention is not limited to such horizontal rotation as my invention is capable of use in other types of heavy machines.

Referring to Fig. 1 the driving shaft comprises three sections, including the center section 6 and two outside sections 7 and 8, which sections are normally in coaxial alinement with each other when the machine is at rest, or running without any deformation in the superstructure. While I have shown in Fig. 2 the connection and details of one end of the center section 6 and all of the outside section 7, it is to be understood that a similar construction is used in the opposite side of the machine, but for brevity only one half of such construction will be shown and described.

The center section 6 is formed at each end with a number of circumferentially spaced splines 9 extending from the outer end of the shaft a distance inwardly sufficient to receive complemental splines in the coupling member 10. Mounted in splines 12 on the inner end of each of the outside shaft sections is a coupling member 13 having teeth 14 intermeshing with the teeth 11 of coupling member 10 (see Fig. 4). Positioned around the outstanding adjacent portions of the clutch teeth 11 and 14 are a pair of channel shaped members 15 and 16 which at their adjacent ends are fixed to these coupling members by pins 17, which pins, when desired, may be removed to enable separation of the center section from the outside section of the shaft. Teeth 11 and 14 are relatively slidable with relation to each other a sufficient amount to accommodate any misalinement that may occur between the outer and inner shafts.

Extending outwardly from the coupling member 13 is a hub 18 having splines interfitting with the splines 12 so that these parts form an integral member around the inner end of the outside section of the shaft. The outer face 19 of the hub 18 is of spherical formation around its exterior circumference; i. e., an annular section of a spherical surface. Positioned outside of the spherically shaped surface 19 is a bearing member 20 also spherically shaped but spaced a slight distance radially from the spherically shaped surface 19 to receive the similarly shaped sleeve or bearing bushing 21 formed of any suitable bearing material. Bearing member 20 is fixed by bolts 22 or other fastening means to the truss 4. As seen in Fig. 2, the truss 4 is formed with a circular opening to receive the bearing member 20 and around the marginal edges of which hole are located in suitable spacing bolts or the like 22. A circular plate 23 is positioned upon the opposite side of the truss 4 to give additional supporting strength to the bearing member 20. As seen in Fig. 5 the bearing member 20 is formed of two semicircular parts which when bolted to the truss 4 will be circular in shape, but removable by removing the bolts 22 to enable the removal of the shaft sections from each other when the channel members 15—16 are removed from the clutch members.

Fixed to the outside section of the driving shaft by splines 24 is a gear 25 connected to suitable power mechanism for driving the drive shaft. Mounted in splines 26 on the outer end of the outside section of the driving shaft is a hub member 27 having integrally or otherwise formed thereon the crank 28 for operating the walking legs 2. The outriggers 5 are formed with a circular opening 29 within which opening is mounted a plane bearing member 30 by bolts or the like 31, there being a sleeve 32 of suitable bearing material interposed between the bearing member 30 and the hub 27, these parts serving as a straight bearing for the outer ends of each of the outside sections 7 and 8. A suitable collar 33 is formed on each of the outside sections 7 and 8 of the driving shaft to assist in holding the hub 27 in proper position thereon.

From the above it will be seen that the spherically shaped bearing portions 19 and 20 form what may be termed a universal-joint bearing which will accommodate deformation and distortion between the driving shaft and the superstructure, and which will take care of any coaxial misalinement between the center section and outside sections of the shaft. This is an important feature of heavy machinery of the type here under discussion, and one which materially promotes efficiency in operation and durability of the parts. These universal-joint bearings entirely remove any binding action or strain at these places between the trusses and the driving shaft, and accommodates these parts to any deformations that may occur under stresses set up by the walking legs in the form of walking machinery shown in the drawings, and that might be set up in other heavy machinery having a tendency to deformation of parts during operation. This is an especially important feature in heavy machinery having walking legs because of the tremendous stresses during operation of the machinery.

In Fig. 6 I have shown a modified arrangement of the driving shaft, in which the center section 6 of the preferred form is omitted and one of the outside sections extended inwardly to take its place. In the form of Fig. 6 the long section of the driving shaft is indicated at 40 and the short section at 41. These two shafts are connected together by the same structural connections and parts shown in detail in Fig. 2 and the short shaft 41 may be of the same length as the outside sections (6 or 7) or longer or shorter as desired for different machines. In Fig. 6 it is shown as being shorter, this length being controlled by the distance between the adjacent truss 4 and outrigger 5. In the form shown in Fig. 6 the long shaft is not connected with the truss 4 on that side of the machine but is merely extended through a larger hole 42 therein or otherwise extended therebeyond. The outer end of each of the long shaft 40 and the short shaft 41 is rotatably mounted in its adjacent outrigger 5 in the same manner as that shown in the left hand side of Fig. 2. The main difference between the preferred form and the form shown in Fig. 6 is that in the former the driving shaft is formed of three sections and in the latter it is formed of two sections.

Any suitable base may be used, such as shown in Fig. 1, or other form of base to suit the requirements of different sizes and forms of machines, as desired. In the form shown in Fig. 6 the opening between the outer end of the long section 40 of the shaft and the right hand truss 4 is large enough to prevent any cramping action between this right hand truss and the shaft, any misalinement of the two sections of the shaft caused by the other parts being accommodated by the universal bearing at the connection between the two shaft sections (see Fig. 2).

Having described my invention, I claim:

1. Apparatus of the character described, including a main base; a machinery supporting superstructure mounted thereon and having trusses; a driving shaft comprising at least two sections normally in alinement with each other; means for connecting the adjacent ends of the sections of said shaft; means at the outer end of each of said sections for operating driving mechanism putting heavy stresses on said superstructure; and bearing means adjacent said connecting means for supporting said shaft on the trusses, said bearing means being spherically constructed to eliminate binding and cramping between the shaft and trusses under heavy stresses set up in the apparatus.

2. Walking mechanism for dragline machines and the like, comprising: a main base; a machinery supporting superstructure mounted thereon and having trusses and outriggers; a driving shaft rotatably mounted in said trusses and outriggers, and having at least two sections normally in alinement with each other; means for operatively connecting the adjacent ends of the sections of said shaft; a walking leg operatively connected with the outer ends of said sections; and a universal joint bearing between said shaft and one of said trusses near the means connecting said sections together to accommodate distortion between the superstructure and the shaft due to heavy stresses set up in the walking mechanism.

3. Walking mechanism for dragline machines and the like, comprising: a main base; a machinery supporting superstructure mounted thereon and having longitudinal trusses and outriggers; a driving shaft rotatably mounted in said trusses and outriggers, and having a center section and two outside sections one on each end of and in alinement with the center section; coupling means for connecting the adjacent ends of the center and outside sections of said shaft; a walking leg operatively connected with each outer end of the outside sections; a straight bearing in each of the outriggers for the outer end of the adjacent outside section of the shaft; and a universal joint bearing between said shaft and each of said trusses near each of said coupling means to accommodate distortion between the superstructure and the shaft due to heavy stresses set up in the walking mechanism.

4. Walking mechanism for dragline machines and the like, comprising: a main base; a machinery supporting superstructure mounted thereon and having longitudinal trusses and outriggers; a driving shaft rotatably mounted in said trusses and outriggers, and having a center section and two outside sections one on each end of and in alinement with the center section; coupling means for connecting the adjacent ends of the center and outside sections of said shaft; a walking leg operatively connected with each outer end of the outside sections; and a universal joint bearing between said shaft and each of said trusses near each of said coupling means to accommodate distortion between the superstructure and the shaft due to heavy stresses set up in the walking mechanism, said universal joint including complemental spherical-segment bearing members enabling free and easy rotation of the shaft with relation to the trusses under said distortion.

5. Walking mechanism for dragline machines and the like, comprising: a main base; a machinery supporting superstructure mounted thereon and having longitudinal trusses; a driving shaft rotatably mounted in said trusses and having a center section and two outside sections one on each end of and in alinement with the center section; a walking leg on each side of the machine operatively connected with the adjacent ends of the outside sections; coupling means for connecting the adjacent ends of the center and outside sections of said shaft, each of said coupling means including a first coupling member fixed to the inner end of an outside section, and a second coupling member fixed to the outer end of the center section, a spherical-segment convex bearing member on said first coupling member and a complemental spherical-segment concave bearing member fixed to one of the trusses, to accommodate distortion between the superstructure and the driving shaft.

6. Walking mechanism for dragline machines and the like, comprising: a main base; a machinery supporting superstructure mounted thereon and having longitudinal trusses; a driving shaft rotatably mounted in said trusses and having a center section and two outside sections one on each end of and in alinement with the center section; a walking leg on each side of the machine operatively connected with the adjacent ends of the outside sections; coupling means for connecting the adjacent ends of the center and outside sections of said shaft, each of said coupling means including a pair of mating coupling members connecting the adjacent ends of the center and outside sections and having interengaging teeth relatively slidable to permit distortion between the center and outside sections, and a universal joint bearing between each of the coupling means and one of said trusses to accommodate distortion between the superstructure and the driving shaft.

7. Walking mechanism for dragline machines and the like, comprising: a main base; a machinery supporting superstructure mounted thereon; a driving shaft rotatably mounted in the superstructure and having a center section and two outside sections normally in axial alinement with each other; a walking leg on each side of the machine and driven by said shaft; and coupling means connecting the adjacent ends of the center and outside sections of the driving shaft, each of said coupling means being mounted in the superstructure by a universal bearing to accommodate distortion between the superstructure and the driving shaft.

8. Walking mechanism for dragline machines and the like, comprising: a main base; a machinery supporting superstructure mounted thereon; a driving shaft rotatably mounted in the superstructure and having a center section and two outside sections normally in axial alinement with each other; a walking leg on each side of the machine and driven by said shaft; and coupling means connecting the adjacent ends of the center and outside sections of the driving shaft, each of said coupling means being mounted in the superstructure by a universal bearing to accommodate distortion between the superstructure and the driving shaft, each of said universal bearings including mating spherical-segment members.

9. Mechanism for walking dragline machines and the like, comprising: a main base; a machinery supporting superstructure; a driving shaft having a plurality of normally axially alined sections; a walking leg on each side of the machine and driven by said shaft; coupling means connecting the adjacent ends of said sections and having interengaging teeth relatively slidable to enable driving connection between said sections under distortion of said axial alinement; and universal bearing means for mounting said shaft in the superstructure, said bearing means having mating spherical-segment members to accommodate distortion between the superstructure and the driving shaft.

10. Mechanism for walking dragline machines and the like, comprising: a main base; a machinery supporting superstructure; a driving shaft rotatably mounted in the superstructure and having a center section and two outside sections one on each end of and normally in axial alinement with the center section; a walking leg on each side of the superstructure and operatively connected with the adjacent ends of the outside sections; coupling means for connecting the adjacent ends of the center and outside sections of said shaft, said coupling means each including a pair of coupling members one on the inner end of an outside section and one on the adjacent outer end of the center section, the inner one of each of said pair including a spherical-segment bearing member; and a mating spherical-segment bearing member operatively mounted upon each of the first mentioned bearing members and fixed to the superstructure, whereby to accommodate misalinement of said shaft sections and distortion between the superstructure and the driving shaft.

11. Mechanism for walking dragline machines and the like, comprising: machinery supporting superstructure; a driving shaft rotatably mounted in the superstructure and comprising two sections normally in axial alinement; a walking leg on each side of the superstructure and operatively connected with the outer end of the adjacent section; coupling means for connecting the adjacent ends of said sections, said coupling means including a pair of coupling members one on each section, one of said coupling members including a spherical-segment bearing member; and a mating spherical-segment bearing member operatively mounted upon said first mentioned spherical-segment bearing member and fixed to the superstructure, whereby to accommodate misalinement of said shaft sections and distortion between the superstructure and the driving shaft.

12. Mechanism for walking dragline machines as claimed in claim 11, and having in the superstructure a pair of laterally spaced trusses, one of said trusses being fixed to said mating spherical-segment bearing member, and the other one of said trusses being free of its adjacent shaft sections.

JOHN W. PAGE.

REFERENCES CITED

The following references are of record in the file of this patent:

UNITED STATES PATENTS

| Number | Name | Date |
|---|---|---|
| 2,164,120 | Page | June 27, 1939 |
| 2,259,199 | Cameron et al. | Oct. 14, 1941 |